US011611874B2

(12) United States Patent
Pang et al.

(10) Patent No.: US 11,611,874 B2
(45) Date of Patent: Mar. 21, 2023

(54) THINCLOUD MESH ACCESS POINT (AP) AND INTERNET OF THINGS (IOT) DEVICE ONBOARDING

(71) Applicant: Cisco Technology, Inc., San Jose, CA (US)

(72) Inventors: Tak Ming F. Pang, Palo Alto, CA (US); Ashish Sood, Cupertino, CA (US); Jie C. Jiang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 111 days.

(21) Appl. No.: 16/667,690

(22) Filed: Oct. 29, 2019

(65) Prior Publication Data

US 2021/0014681 A1    Jan. 14, 2021

Related U.S. Application Data

(60) Provisional application No. 62/873,153, filed on Jul. 11, 2019.

(51) Int. Cl.
| H04W 12/06 | (2021.01) |
| H04W 12/65 | (2021.01) |
| H04W 12/71 | (2021.01) |
| H04W 12/77 | (2021.01) |

(52) U.S. Cl.
CPC .......... H04W 12/06 (2013.01); H04W 12/65 (2021.01); H04W 12/71 (2021.01); H04W 12/77 (2021.01)

(58) Field of Classification Search
CPC ..... H04W 12/06; H04W 12/77; H04W 12/65; H04W 12/71; H04W 4/029; H04W 8/00; H04W 8/18; G16H 10/65; G16H 20/10; G16H 50/20; G06F 16/955; H04L 12/26; H04L 29/06; H04L 29/08; H04L 29/12
See application file for complete search history.

(56) References Cited

U.S. PATENT DOCUMENTS

| 2014/0101264 | A1* | 4/2014 | Dewaele | H04L 63/08 |
| | | | | 709/206 |
| 2014/0283016 | A1* | 9/2014 | Sambamurthy | H04W 12/069 |
| | | | | 726/19 |
| 2019/0166118 | A1* | 5/2019 | Lee | H04L 9/3236 |
| 2019/0378624 | A1* | 12/2019 | Pulitzer | G16H 50/20 |
| 2020/0162890 | A1* | 5/2020 | Spencer | H04L 67/303 |

OTHER PUBLICATIONS

E. Lear and O. Friel, "Proof of Possesion to Devices for Onboarding draft-lear-brski-pop-OO," Network Working Group, Oct. 20, 2018, 7 pages.

* cited by examiner

*Primary Examiner* — Ashokkumar B Patel
*Assistant Examiner* — William B Jones
(74) *Attorney, Agent, or Firm* — Patterson + Sheridan, LLP

(57) ABSTRACT

A computing device determines an onboarding algorithm to use for onboarding a wireless device. The computing device determines, based on the onboarding algorithm, a first set of predefined information and a second set of dynamically generated information to use as inputs to the onboarding algorithm. The computing device generates, via the onboarding algorithm, a set of credentials based on the first set of predefined information and the second set of dynamically generated information, and uses the set of credentials to secure a connection for onboarding the wireless device.

20 Claims, 9 Drawing Sheets

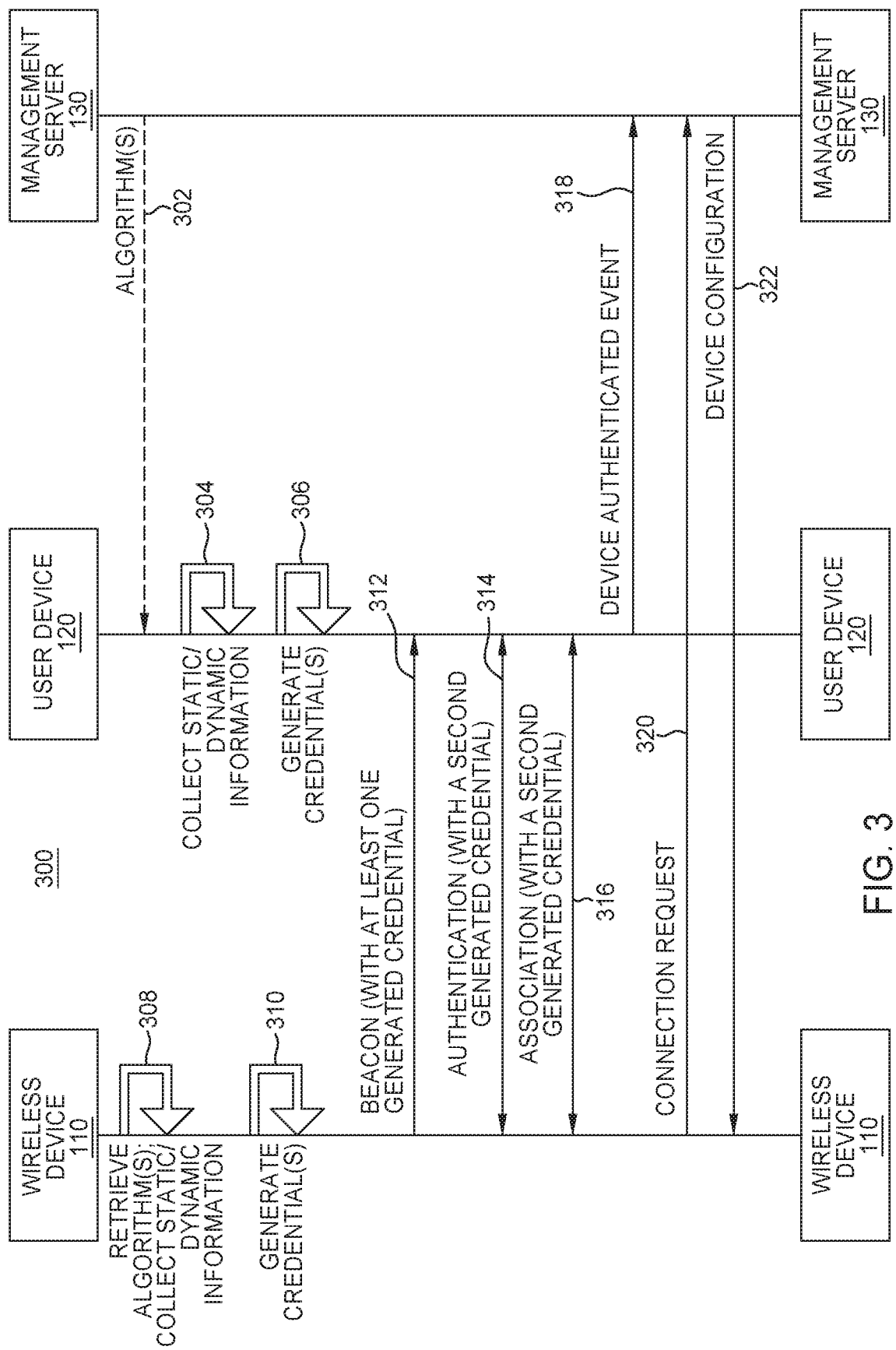

THINCLOUD MESH ACCESS POINT (AP) AND INTERNET OF THINGS (IOT) DEVICE ONBOARDING

CROSS-REFERENCE TO RELATED APPLICATIONS

This application claims benefit of U.S. provisional patent application Ser. No. 62/873,153, filed 11 Jul. 2019. The aforementioned related patent application is herein incorporated by reference in its entirety.

TECHNICAL FIELD

Embodiments presented in this disclosure generally relate to wireless device management. More specifically, embodiments disclosed herein relate to improved techniques for onboarding wireless devices, such as mesh access points (APs) and Internet of Things (IoT) devices.

BACKGROUND

Onboarding wireless devices including indoor/outdoor mesh APs and in home IoT devices is a common problem. The common practice is for the wireless (onboarding) device to broadcast a predefined service set identifier (SSID) derived from pre-configured static information (e.g., media access control (MAC) address, etc.), and the user to associate a user device (e.g., cell phone or other device) through a network to the wireless device. The user generally runs a software application on the user device to configure the wireless device. Once the wireless device completes basic connectivity configurations, the wireless device can connect to a management server to complete the full configuration. However, this process of onboarding wireless devices relies on a simple method for securing the network connection and provides minimum security. As a result, it is not suitable for today's enterprise or carrier deployments.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 3 depicts an example call flow for securing a connection for device onboarding, according to one embodiment described herein.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
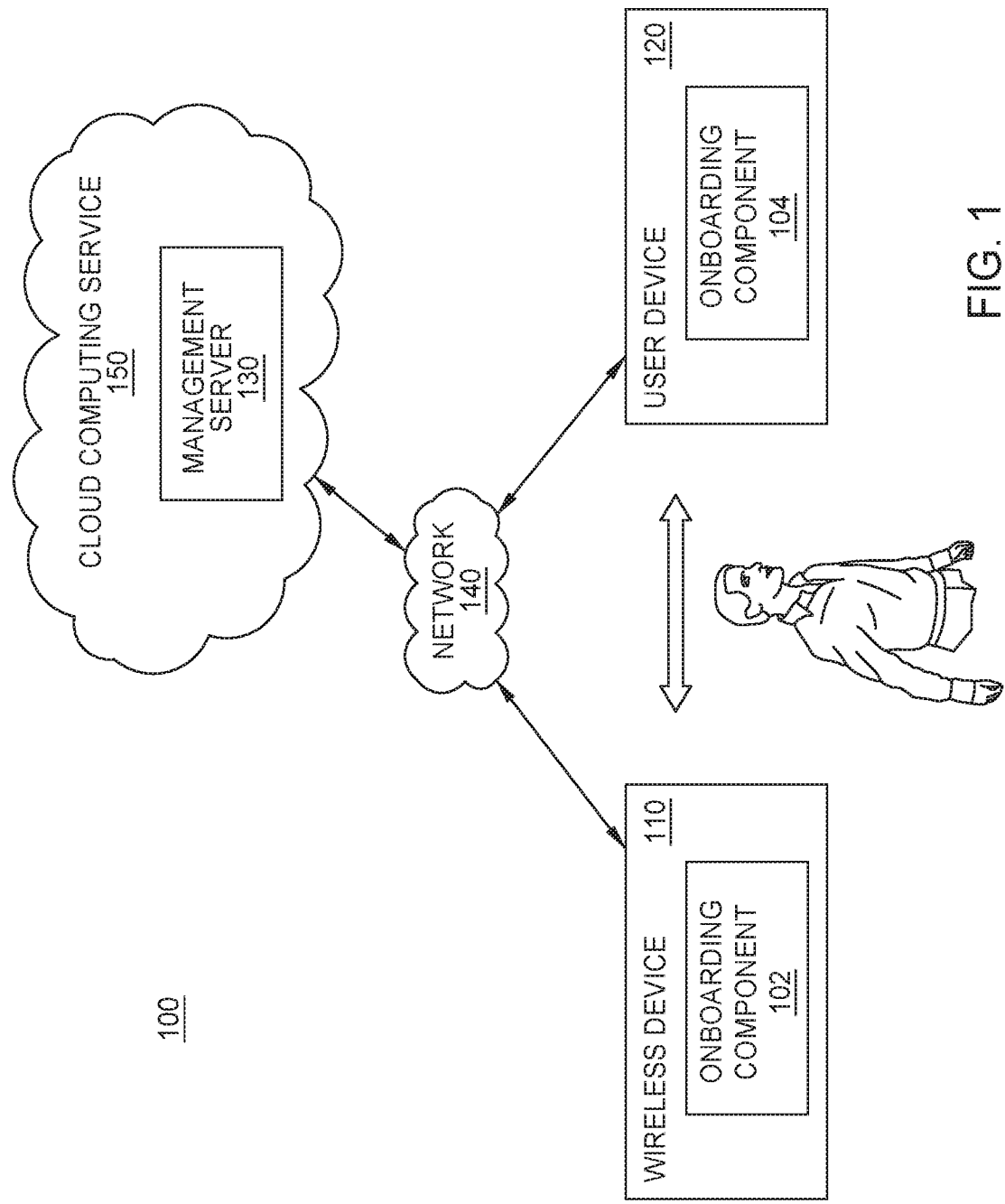
FIG. 1 illustrates an example device onboarding environment, according to one embodiment described herein.

One embodiment presented in this disclosure provides a computer-implemented method for onboarding wireless devices. The method generally includes determining an onboarding algorithm to use for onboarding a wireless device. The method also includes determining, based on the onboarding algorithm, a first set of predefined information and a second set of dynamically generated information to use as inputs to the onboarding algorithm. The method further includes generating, via the onboarding algorithm, a set of credentials based on the first set of predefined information and the second set of dynamically generated information. The method further yet includes using the set of credentials to secure a connection for onboarding the wireless device.

Another embodiment presented in this disclosure provides a computing device. The computing device generally includes a processor and a memory containing a program that, when executed by the processor, performs an operation for onboarding wireless devices. The operation generally includes determining an onboarding algorithm to use for onboarding a wireless device. The operation also includes determining, based on the onboarding algorithm, a first set of predefined information and a second set of dynamically generated information to use as inputs to the onboarding algorithm. The operation further includes generating, via the onboarding algorithm, a set of credentials based on the first set of predefined information and the second set of dynamically generated information. The operation further yet includes using the set of credentials to secure a connection for onboarding the wireless device.

Yet another embodiment presented in this disclosure provides a computer-readable medium. The computer-readable medium includes computer program code that, when executed by one or more processors, performs an operation for onboarding wireless devices. The operation generally includes determining an onboarding algorithm to use for onboarding a wireless device. The operation also includes determining, based on the onboarding algorithm, a first set of predefined information and a second set of dynamically generated information to use as inputs to the onboarding algorithm. The operation further includes generating, via the onboarding algorithm, a set of credentials based on the first set of predefined information and the second set of dynamically generated information. The operation further yet includes using the set of credentials to secure a connection for onboarding the wireless device.

Example Embodiments

Embodiments described herein provide improved techniques for onboarding wireless devices. More specifically, embodiments provide techniques that employ static (e.g., predefined) and dynamically generated information to dynamically generate a SSID, password, and/or username to secure the connection used to onboard the wireless device. The static information can include, but is not limited to, a device name, manufacturer information, device serial number, MAC address, etc. The dynamically generated information can include, but is not limited to, global positioning system (GPS) information, a reset button press pattern, short-range communication frames (e.g., Bluetooth, Bluetooth Low Energy (BLE), etc.), and other environmental parameters or information.

According to one embodiment described herein, rather than use solely static information to pre-define a SSID and security with a fixed password, embodiments can use a set of dynamically generated information (also referred to herein as "dynamic information) (or a combination of static and dynamically generated information) to derive "dynamic" SSIDs and passwords for the onboarding device (e.g., mesh AP, IoT device) and the onboarding application on the user device (e.g., smartphone, tablet, etc.). The dynamically generated information may be generated based on a current set of environmental conditions at a location of the onboarding device (e.g., at a time of installation of the onboarding device). In some embodiments, static and/or dynamic information can be used to dynamically generate a basic service set identifier (BSSID) to use for the onboarding wireless network (e.g., wireless local area network (WLAN). In these embodiments, the set of dynamic information (or combination of static and dynamic information) can be used to derive a temporary BSSID for the onboarding wireless network. In this manner, it is possible to have different SSIDs and passwords for the same onboarding device at different installation attempts and/or different installation locations. This, in turn, can significantly improve the security of the onboarding process, relative to conventional onboarding techniques.

Note that while many of the following embodiments are discussed with reference to a local user environment in which the user attempts to onboard a wireless device, the techniques discussed herein are also applicable to any large scale system. For example, the techniques discussed herein can be applied to data center systems, cloud-managed networking device management systems, and many other suitable systems.

FIG. 1 illustrates a device onboarding environment 100, according to one embodiment described herein. As shown, the device onboarding environment 100 includes a wireless (onboarding) device 110, a user device 120, and a cloud computing platform 150, that are interconnected via a network 140. The network 140 can be any suitable communication network, including the Internet, a local area network (LAN), a wide area network (WAN), a cellular network, etc. In one embodiment described herein, the wireless device 110 may be a device that has not undergone an onboarding process. For example, the wireless device 110 may not have been initially registered or authorized with the cloud computing platform 150, and thus may not be configured initially to operate using services of the cloud computing platform 150. The cloud computing platform 150 includes a management server 130, which is generally configured to maintain configuration and connection information for onboarding wireless devices (e.g., wireless device 110). Note that, as used herein, "onboarding a device" (also referred to herein as performing "device onboarding") may refer to the process in which a device establishes a connection (or gains access) to a network (e.g., cloud computing platform 150) for the first (or initial) time.

The wireless device 110 is representative of various types of devices. In one embodiment, the wireless device 110 can include a network device (e.g., router, switch, (mesh) AP, etc.). In one particular embodiment, the wireless device 110 can include an indoor/outdoor mesh AP. In another embodiment, the wireless device 110 can include an IoT device (e.g., IoT camera, IoT speaker, IoT thermostat, IoT door lock, etc.). The IoT device may be embedded with electronics, software, sensors, and the like, which enable the IoT device to collect and exchange data, via an IoT platform (e.g., cloud computing platform 150). For example, an IoT-based thermostat can collect data relating to the schedule of and usage by an individual to automatically program itself. In another example, an IoT-based door lock may be able to detect a wireless signal, compare the signal with a wireless fingerprint, and unlock a door based on the comparison. An IoT device may communicate with the IoT platform in order to exchange data (e.g., with the IoT platform and/or other devices), store data (e.g., for processing by the IoT platform), receive executable code to be performed by the device, etc.

In one embodiment described herein, a user may employ a user device 120 to aid in onboarding the wireless (onboarding) device 110. The user device 120 can be representative of a variety of types of computing devices, including, but not limited to, a smartphone, a tablet, desktop, laptop, etc. The user device 120 includes an onboarding component 104, which is configured to implement one or more techniques presented herein for device onboarding. Similarly, the wireless device 110 includes an onboarding component 102, which is configured to implement one or more techniques presented herein for device onboarding. As described in more detail below, in one embodiment, the onboarding components 102 and 104 can use a same set of inputs and onboarding algorithm(s) to generate one or more credentials for device onboarding. The onboarding components 102 and 104 can then perform device onboarding (e.g., for wireless device 110) via a connection secured with the one or more credentials.

The set of inputs can include static information, such as a MAC address of the wireless device 110, serial number of the wireless device 110, release number of the wireless device 110, etc. Additionally, the set of inputs can include dynamic information, examples of which include, but are not limited to, GPS information, a reset button press pattern, short-range communication frames (e.g., Bluetooth, Bluetooth Low Energy (BLE), etc.), and other environmental conditions available at a location of the wireless device. The credentials can include, but are not limited to, a SSID, username, password, basic service set identifier (BSSID), etc.

In one embodiment, the selection of the onboarding algorithm(s) determines which combination of static and/or dynamic information will be used to generate the set of credentials. For example, the combination of static/dynamic information and/or the set of onboarding algorithms may vary from onboarding device to onboarding device (e.g., different releases may have different pre-configured algorithms and algorithm inputs). Further, even for the same release of an onboarding device, the combination of static/ dynamic information may vary depending on at least one of: the location of the onboarding device and the particular time an installation attempt occurs for the onboarding device. By allowing the onboarding algorithms and/or the combination of static/dynamic information to vary in this manner, embodiments can significantly reduce the likelihood of a malicious actor applying knowledge learned from brute forcing to comprise the onboarding process.

Further, even if a malicious actor were to learn some of the dynamic information used for generating the set of credentials (e.g., a malicious actor may be able to access (or eavesdrop) Bluetooth and GPS information, any access of this information may not compromise the generation of the set of credentials, as there may be other inputs (information) used in the generation of the set of credentials.

Figure 2:
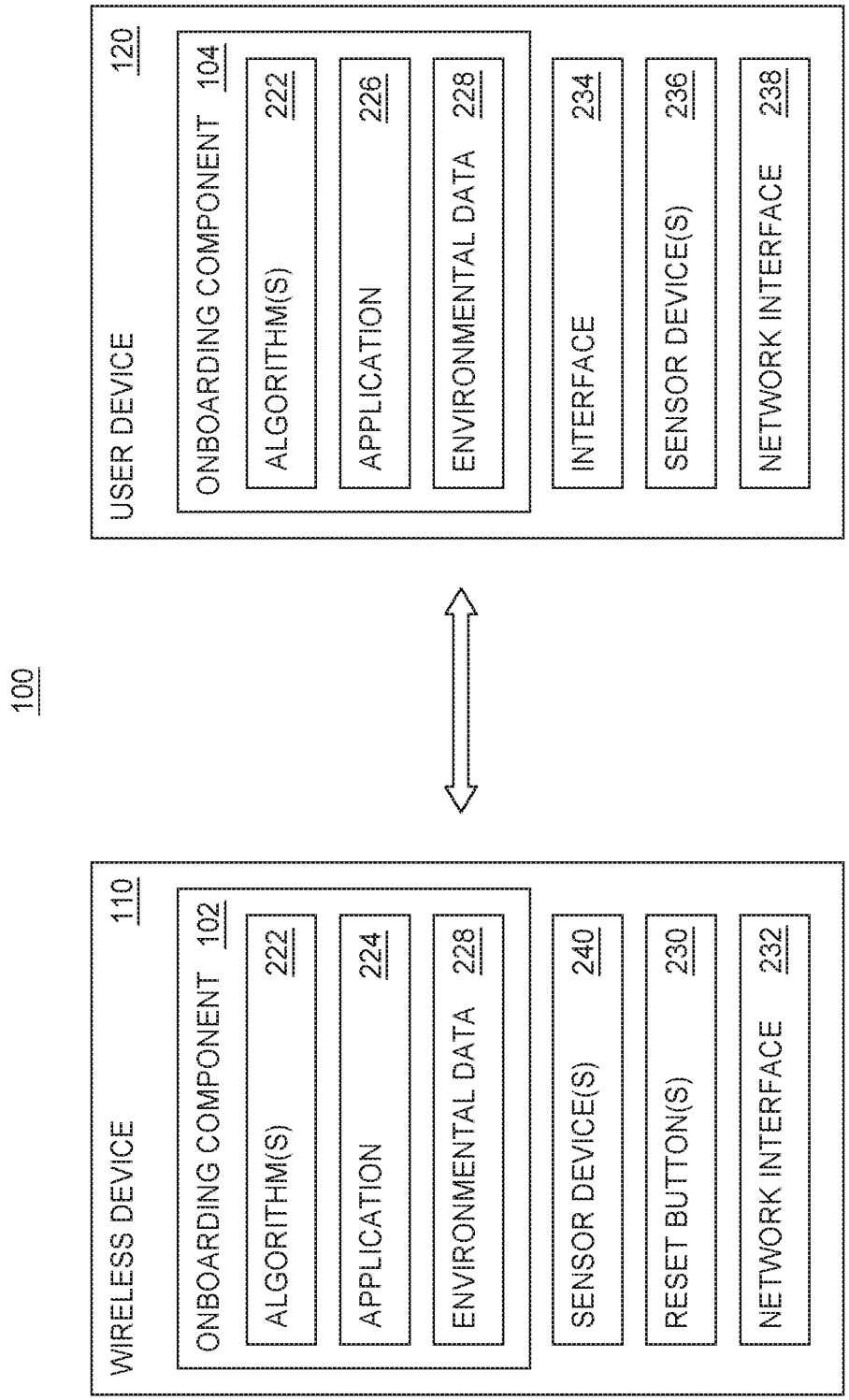
FIG. 2 is a block diagram of an example user device and wireless device in the device onboarding environment depicted in FIG. 1, according to one embodiment described herein.

FIG. 2 is a block diagram illustrating a wireless device 110 and a user device 120 of a device onboarding environment 100, according to one embodiment described herein. The wireless device 110 includes the onboarding component 102, one or more sensor devices 240, and a network interface 232. The user device 120 includes the onboarding component 104, a user interface 234, one or more sensor devices 236, and a network interface 238.

The sensor devices 236 and 240 can collect environmental information (or data), which can be used (e.g., as dynamic inputs) to secure the connection used to onboard the wireless device 110. The sensor devices 236 and 240 can include, but are not limited to, camera sensors/devices, microphone sensors/devices, location sensors (e.g., GPS), Bluetooth sensors/devices, etc. The wireless device 110 and the user device 120 can communicate using the network interfaces 232 and 238, respectively. The network interfaces 232 and 238 can implement a wired communication protocol (e.g., Ethernet), a wireless communication protocol (e.g., WiFi), etc.

In some embodiments, the wireless device 110 also includes a reset button 230, which can be used to reset the wireless device 110 back to an initial/default state. In one particular embodiment described herein, the reset button 230 can also be used to provide a set of dynamic inputs for securing the connection used to onboard the wireless device 110. Additionally, in some embodiments, a virtual reset button can be provided on the interface 234 of the user device 120. For example, as described below, a user can press the reset button 230 in a particular pattern (e.g., number of presses, duration of presses, and/or frequency of presses) and input the same pattern with the virtual reset button on the interface 234 to provide a seed that can be used for generating a set of credentials for device onboarding of wireless device 110.

As noted, embodiments herein enable the onboarding component 102 of wireless device 110 and the onboarding component 104 of user device 120 to use the same "shared algorithm" and inputs to generate one or more credentials used for onboarding of wireless device 110. Each of the onboarding components 102 and 104 can include solely hardware and firmware or can include combinations of hardware and software elements. As shown, the onboarding component 102 includes algorithm(s) 222, application 224, and environmental data 228, and the onboarding component 104 includes algorithm(s) 222, application 226, and environmental data 228.

Applications 224 and 226 allow user(s) to manage device onboarding of the wireless device 110. In one example, a user can use application 224 and/or application 226 to access a web page or portal associated with setting up the wireless device 110 (e.g., for the first time) to access the cloud computing platform 150. In some cases, the application 224 may not be configured (e.g., initially) to access services of the cloud computing platform 150. In such cases, the user can use application 226 to initially configure the application 224 to access the cloud computing platform 150.

In one embodiment, the algorithm(s) 222 may be pre-configured for the wireless device 110 and stored on the wireless device 110. For example, the wireless device 110 can be pre-configured to use a particular set of algorithm(s) 222 by the manufacturer of the wireless device 110. As described in more detail below, the application 224 can scan/capture (e.g., using one of the sensor devices 240, such as a camera device) static information associated with the wireless device 110 to determine which algorithm(s) 222 the wireless device 110 is configured to use for device onboarding. The static information can include identifying information of the wireless device 110, such as a MAC address, serial number, release number, barcode, QR code, etc. In one embodiment, the user device 120 may be pre-configured with multiple algorithms 222 (e.g., multiple algorithms may be complied into the software) and may generate and transmit to the management server 130 a request, which includes the identifying information, for the particular set of algorithm(s) 222. In one embodiment, in response to the request, the user device 120 can receive an indication of the set of algorithm(s) 222 that the wireless device 110 is configured to use from the management server 130, and select the set of algorithm(s) 222 from the multiple algorithms stored on the user device 120. In another embodiment, in response to the request, the user device 120 can receive (e.g., download) executable code of the algorithm(s) 222 that the wireless device 110 is configured to use from the management server 130, and run the executable code once it is received (e.g., once the download is complete). In this embodiment, the set of algorithm(s) 222 does not have to be compiled into the software (e.g., application 226) of the user device 120. With respect to the wireless device 110, the application 224 (of the wireless device 110) can determine the set of information (e.g., set of static and/or dynamic information) to use an inputs to the algorithm(s) 222, based on the preconfigured set of algorithm(s) 222 stored on the wireless device 110.

Each of the application 224 and the application 226 can capture the set of information (e.g., using respective sensor devices 240 and 236), and use the set of information as inputs into the same algorithm(s) 222. In one embodiment, the applications 224 and 226 can generate a set of credentials, via the algorithms 222, to secure a connection used for device onboarding of wireless device 110. For example, the application 226 may initiate and participate in an authentication and/or association procedure with the application 224, based on the set of credentials. Once the application 224 is successfully authenticated and/or associated, the application 224 can connect to (or access) the management server 130 to complete configuration for device onboarding.

FIG. 3 depicts an example call flow 300 for securing a connection for device onboarding, according to one embodiment described herein. In particular, the call flow 300 depicts an example communication exchange between the wireless device 110, user device 120, and management server 130. At 302, the user device 120 may retrieve the particular set of algorithm(s) 222 to use for device onboarding from the management server 130. For example, in one embodiment, prior to receiving the algorithm(s) at 302, the user device 120 may scan (or capture) identifying information available to a user (e.g., owner) of the wireless device 110. As noted, such identifying information can include, but is not limited to, a MAC address of the wireless device 110, a serial number of the wireless device 110, a release number of the wireless device 110, etc. In some embodiments, the user device 120 can scan (or capture an image of) a barcode or QR code on the wireless device to determine the identifying information.

Once the identifying information is obtained, the user device 120 may query the management server 130 for the set of algorithm(s) 222 corresponding to the identifying information and receive an indication of the algorithm(s) 222 from the management server 130 at 302. In another embodiment, the user device 120 may query the management server 130 for the set of algorithm(s) 222 corresponding to the identifying information and receive (e.g., download) executable code of the algorithm(s) from the management server 130 at 302. In one reference example, the user device 120 can identify the algorithm(s) 222 and/or the release of the wireless device 110 from the serial number of the wireless device 110 and interact with the management server 130 (e.g., at 302) to select the correct algorithm(s) 222 matching the algorithm configured for the release of the wireless device 110 or the onboarding device specific algorithm complied into the software. At 304, the user device 120 collects (or captures) a set of static information and/or a set of dynamic information, based at least in part on the algorithm(s) 222. The user device 120 may use the sensor device(s) 236 to collect the set of static information and/or the set of dynamic information.

The same set of algorithm(s) 222 (identified by the user device 120) may be pre-configured (e.g., by a manufacturer of the wireless device 110) and stored on the wireless device 110. Similarly, the set of static and/or dynamic information that the wireless device 110 is to use for device onboarding may be preconfigured for the wireless device 110 (e.g., by a manufacturer of the wireless device 110). At 308, the wireless device 110 retrieves the set of algorithm(s) 222, and collects the set of static and/or dynamic information.

As noted, the set of static information can include, but is not limited to, a device name, manufacturer information, device serial number, MAC, etc. In one embodiment, the dynamic information can include GPS information. For example, the information can include any of the location, signal, number of satellites seen (or combination thereof) by the respective user device 120 and the wireless device 110 at the current installation location of the wireless device 110. In some cases, the GPS information could include information associated with an address (e.g., address number, street name, city, county, etc.) of the location of the wireless device 110.

In another embodiment, the dynamic information can include the pattern of pressing the reset button 230 on the wireless device 110 and the pattern of pressing (or entering) a reset pattern on the interface 234 of the user device 120. In another embodiment, the dynamic information can include any information (e.g., one or more bits) from a Bluetooth frame and signal exchanged at the installation location. For example, the user device 120 may transmit a Bluetooth frame to the wireless device 110, and may use one or more bits from the Bluetooth frame for at least a part of the dynamic information. Likewise, the wireless device 110 may use the same one or more bits from the received Bluetooth frame.

In some embodiments, the dynamic information can include audio content at the installation location. For example, the user device 120 can capture (e.g., using one of the sensor devices 236, such as a microphone) audio content at the installation location and the wireless device 110 can capture (e.g., using one of the sensor devices 240, such as a microphone) the same audio content at the installation location. In some embodiments, the dynamic information can include a photo of a scene at the installation location. For example, the user device 120 can capture (e.g., using one of the sensor device 236, such as a camera) a photo of a particular object(s) at the installation location, and the wireless device 110 can capture (e.g., using one of the sensor devices 240, such as a camera) a phot of the same particular object(s) at the installation location.

Note, however, that the above examples of dynamic information are provided merely as reference examples of the type of dynamic information that can be used to dynamically generate a set of credentials (e.g., SSID, username, password, BSSID, etc.) used to secure the onboarding procedure. In general, the dynamic information can include any type of environmental information that can be obtained at the installation location. The dynamic information, for example, can include user driven information (e.g., reset button pattern) and/or auto-acquisition inputs (e.g., GPS, Bluetooth frames, etc.).

The user device 120 (at 306) and the wireless device 110 (at 310) generate a set of credentials using the collected static/dynamic information. For example, the user device 120 and the wireless device 110 can run the same set of algorithm(s) 222 and use the same combination of dynamic and/or static information to generate the same dynamic SSID, username, and password combination. In one embodiment, the set of algorithms 222 can include a single algorithm or multiple algorithms. In one reference example, the set of algorithms 222 can include an algorithm for generating a shared key and/or an algorithm for generating a hash. In general, however, any number of algorithms can be configured for the onboarding process using the techniques presented herein.

Figure 4A:
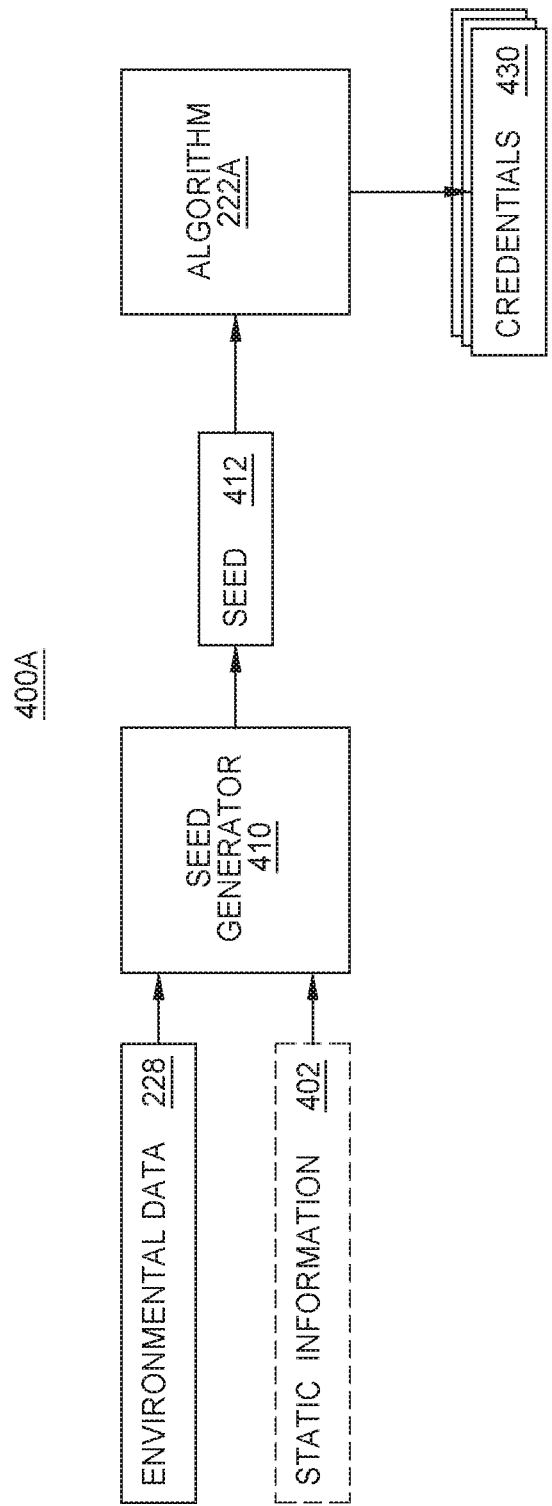
FIG. 4A depicts an example workflow for generating a set of credentials, according to one embodiment described herein.
Figure 4B:
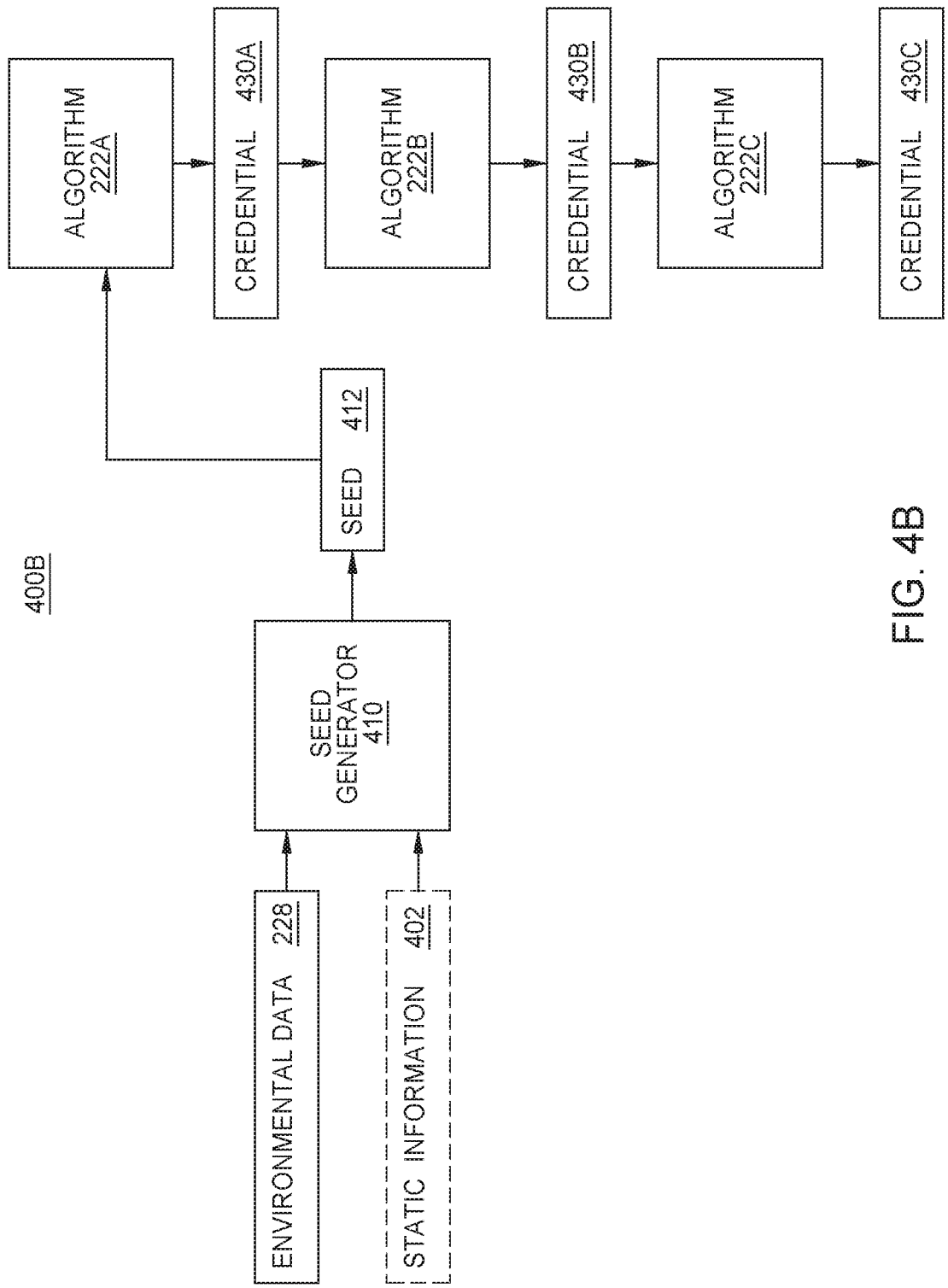
FIG. 4B depicts another example workflow for generating a set of credentials, according to one embodiment described herein.

FIGS. 4A and 4B, for example, depict example workflows 400A and 400B for generating a set of credentials, according to one embodiment described herein. In workflows 400A and 400B, a seed generator 410 receives environmental data 228 (and, in some cases, static information 402) and converts the received information into a seed 412. The seed generator 410 can employ a variety of techniques to generate the seed 412, including, for example, concatenating the information, transforming the information from a first format (e.g., text) to a second format (e.g., ASCII text), and the like. In one example, assuming the environmental data 228 includes information from a reset button, the seed generator 410 can convert the number of times of the reset button press, the duration of each press, and/or the frequency of the button press into a random seed for generating the set of credentials. In another embodiment, assuming the environmental data 228 includes information from a Bluetooth frame, the seed generator 410 can use a subset of the information bits (e.g., bytes 10-20) of the frame as the seed 412. In cases where the seed generator 410 also receives static information 402, the seed generator 410 can combine (e.g., concatenate) the static information 402 and the environmental data 228, and transform the information into a common format (e.g., ASCII characters) for the seed 412.

In FIG. 4A, the seed 412 is provided to a single algorithm 222A, which generates the set of credentials 430. In one reference example, the algorithm 222A may be a hashing algorithm (e.g., secure hash algorithm 1 (SHA-1), SHA-256, message-digest algorithm, such as MD5, etc.) that computes a hash of the seed 412. In another reference example, the algorithm 222A may be shared key algorithm that computes a shared secret based on the seed 412. Note, however, that the algorithm 222A can employ any type of cryptographic function or technique to generate a set of credentials. In one embodiment, multiple credentials can be generated based on the same output of the algorithm 222A. In one reference example, a first subset of the output (e.g., bytes 0-10) of the algorithm 222A can be used as the first credential 430, a second subset (e.g., bytes 11-20) of the output of the algorithm 222A can be used as the second credential 430, a third subset (e.g., bytes 21-30) of the output of the algorithm 222A can be used as the third credential 430, and so on. Each credential 430 may be an alpha-numeric character string generated from the algorithm 222A.

In another example shown in FIG. 4B, the seed 412 can be provided to a first algorithm 222A, which generates a first credential 430A. The first credential 430A is provided to a second algorithm 222B, which generates a second credential 430B based in part on the first credential 430A. The second credential 430B is provided to a third algorithm 222C, which generates a third credential 430C based in part on the second credential 430B. Assuming, for example, that the first credential is a SSID, then the SSID can be used to generate a username (e.g., second credential), the username can be used to generate a password (e.g., third credential), and so on. Note that the algorithms 222A-222C may employ any type of cryptographic function or technique (e.g., hashing algorithm, shared key algorithm, etc.). Similar to FIG. 4A, each credential 430A, 430B, and 430C may be an alpha-numeric character string generated from the respective algorithms 222A, 222B, and 222C. Additionally, in some cases, the length of each of the credentials 430A, 430B, and 430C can vary based on the particular algorithm 222.

Returning back to FIG. 3, the user device 120 and the wireless device 110 may use the generated set of credentials to perform authentication and/or association. At 312, for example, the wireless device 110 may broadcast a beacon (with at least one generated credentials, such as an SSID). Note, while FIG. 3 uses the example of a beacon, in some embodiments, the wireless device 110 may send a probe response (containing the SSID) to the user device 120, in response to receiving a probe request from the user device 120. Moreover, in some embodiments, to provide added security, the wireless device 110 may not include the SSID in the beacon or probe response. In this embodiment, the user device 120 may directly initiate an association request to the AP (e.g., with the generated credentials).

At 314, the user device 120 and the wireless device 110 participate in an authentication procedure and, at 316, participate in an association procedure (e.g., using at least a second generated credential, such as a username/password). In general, the user device 120 and the wireless device 110 may employ any authentication/association procedure, including but not limited to, 802.11 authentication/association. Once the wireless device 110 is successfully authenticated and/or associated with the user device 120, the user device 120 can send an indication of a device authenticated event (for the wireless device 110) to the management server 130 (318). The wireless device 110 may then send a connection request to the management server (320) and receive a configuration to access services of the cloud computing platform 150 (322).

Figure 5:
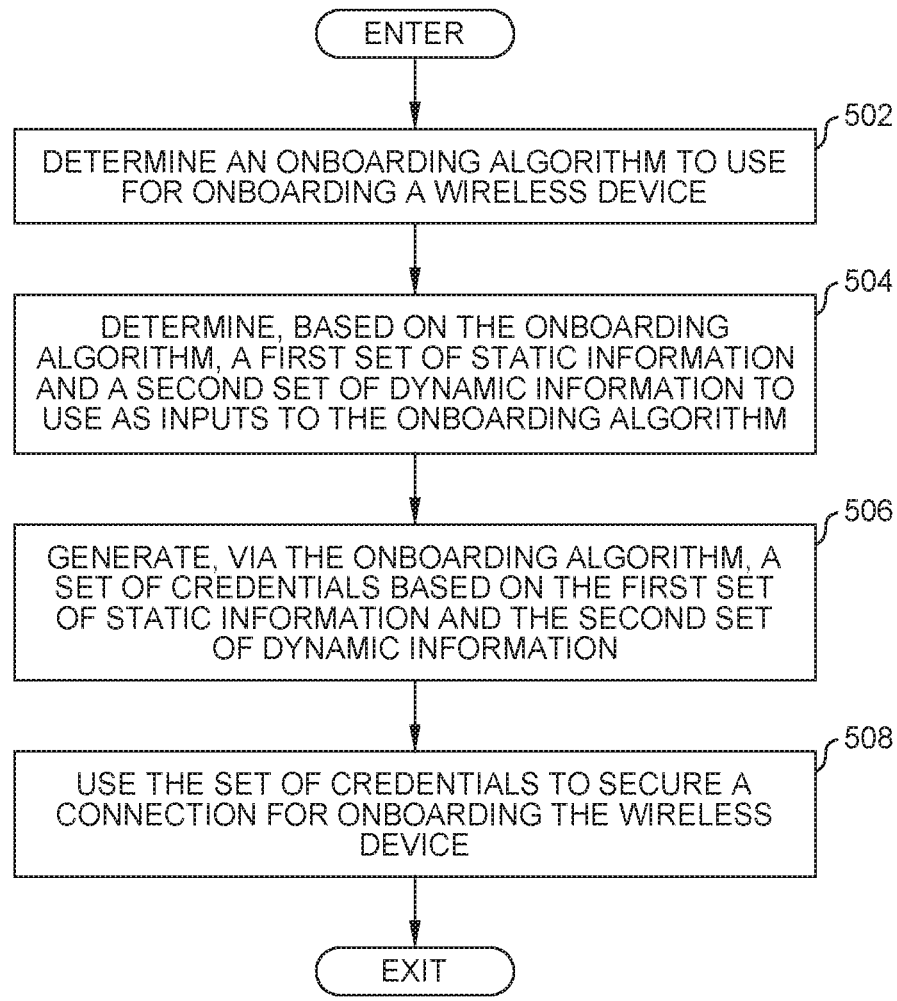
FIG. 5 is a flowchart of a method for onboarding a wireless device, according to one embodiment described herein.

FIG. 5 is a flowchart of a method 500 for onboarding a wireless device, according to one embodiment. The method 500 may be performed by a user device (e.g., user device 120).

The method 500 may enter at block 502, where the user device determines an onboarding algorithm (e.g., algorithm 222) to use for onboarding a wireless device (e.g., wireless device 110). At block 504, the user device determines, based on the onboarding algorithm a first set of static information (e.g., static information 402) and a second set of dynamic information (e.g., environmental data 228) to use as inputs to the onboarding algorithm. At block 506, the user device generates, via the onboarding algorithm, a set of credentials (e.g., credential(s) 430) based on the first set of static information and the second set of dynamic information. At block 508, the user device uses the set of credentials to secure a connection for onboarding the wireless device.

Figure 6:
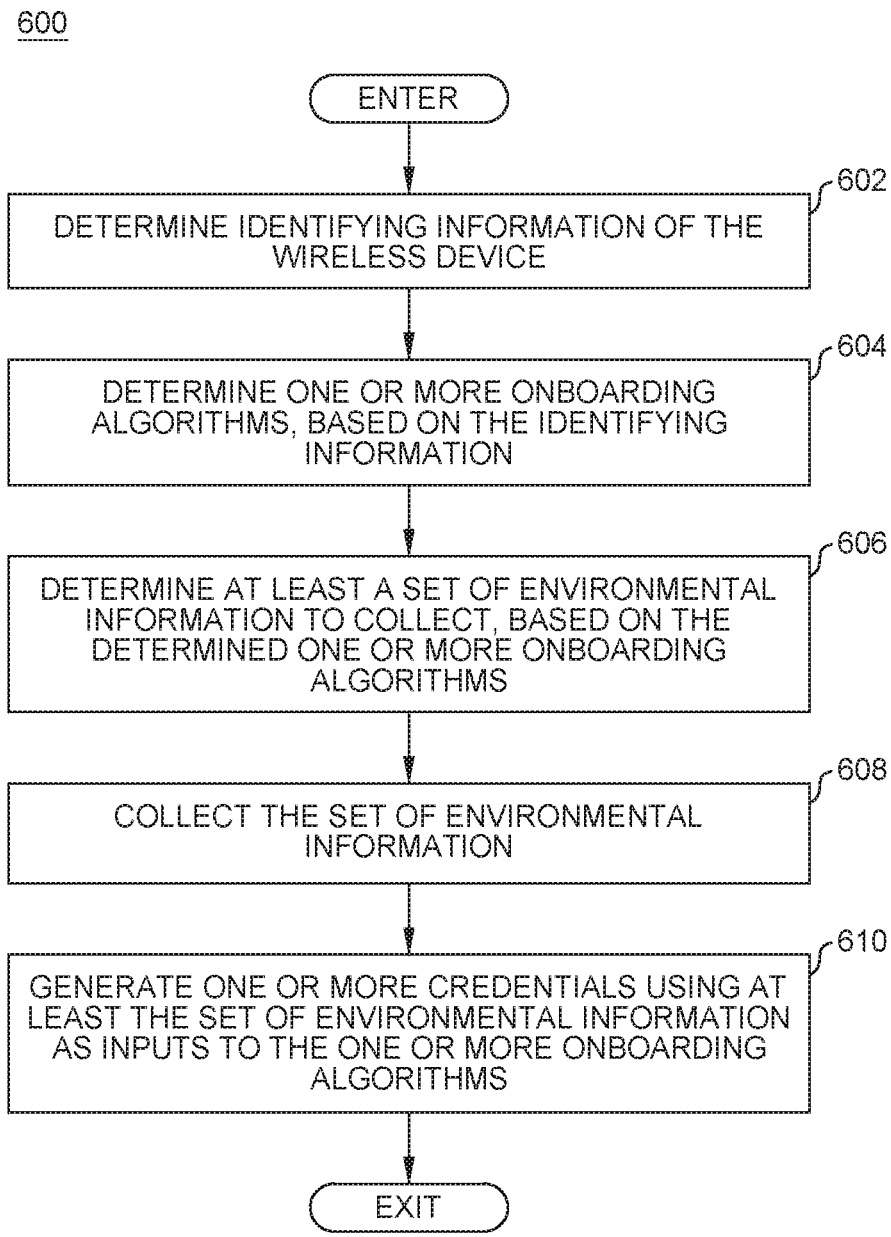
FIG. 6 is a flowchart of a method for generating credentials for onboarding a wireless device, according to one embodiment described herein.

FIG. 6 is a flowchart of a method 600 for generating credentials used to secure a connection for onboarding a wireless device, according to one embodiment. The method 600 may be performed by a computing device (e.g., the wireless device 110 and/or the user device 120).

The method 600 may enter at block 602, where the computing device determines identifying information of the wireless device (e.g., wireless device 110). For example, assuming the computing device is the user device 120, computing device may capture an image of identifying information (e.g., serial number) located on the wireless device. In another example, assuming the computing device is the wireless device 110, the computing device already has knowledge of the identifying information.

At block 604, the computing device determines one or more onboarding algorithms (e.g., algorithm(s) 222), based on the identifying information. For example, in the case that the computing device is the user device 120, the computing device may query the management server 130 for the one or more onboarding algorithms, using the identifying information. In another example, in the case the computing device is the wireless device 110, the computing device may have a priori knowledge of the onboarding algorithms it is preconfigured to use for device onboarding.

At block 606, the computing device determines at least a set of environmental information (e.g., environmental data 228) to collect, based on the determined one or more onboarding algorithms. At block 608, the computing device collects the set of environmental information. At block 610, the computing device generates one or more credentials using at least the set of environmental information as inputs to the one or more onboarding algorithms.

Advantageously, embodiments provide techniques that allow for dynamically generating credentials (e.g., SSID, username, password, etc.) used for the onboarding process, as opposed to using static credentials that are pre-configured for the onboarding device. Embodiments enable the credentials to vary by onboarding device to onboarding device, location to location, release by release, the various input(s) that are used, etc.

Figure 7:
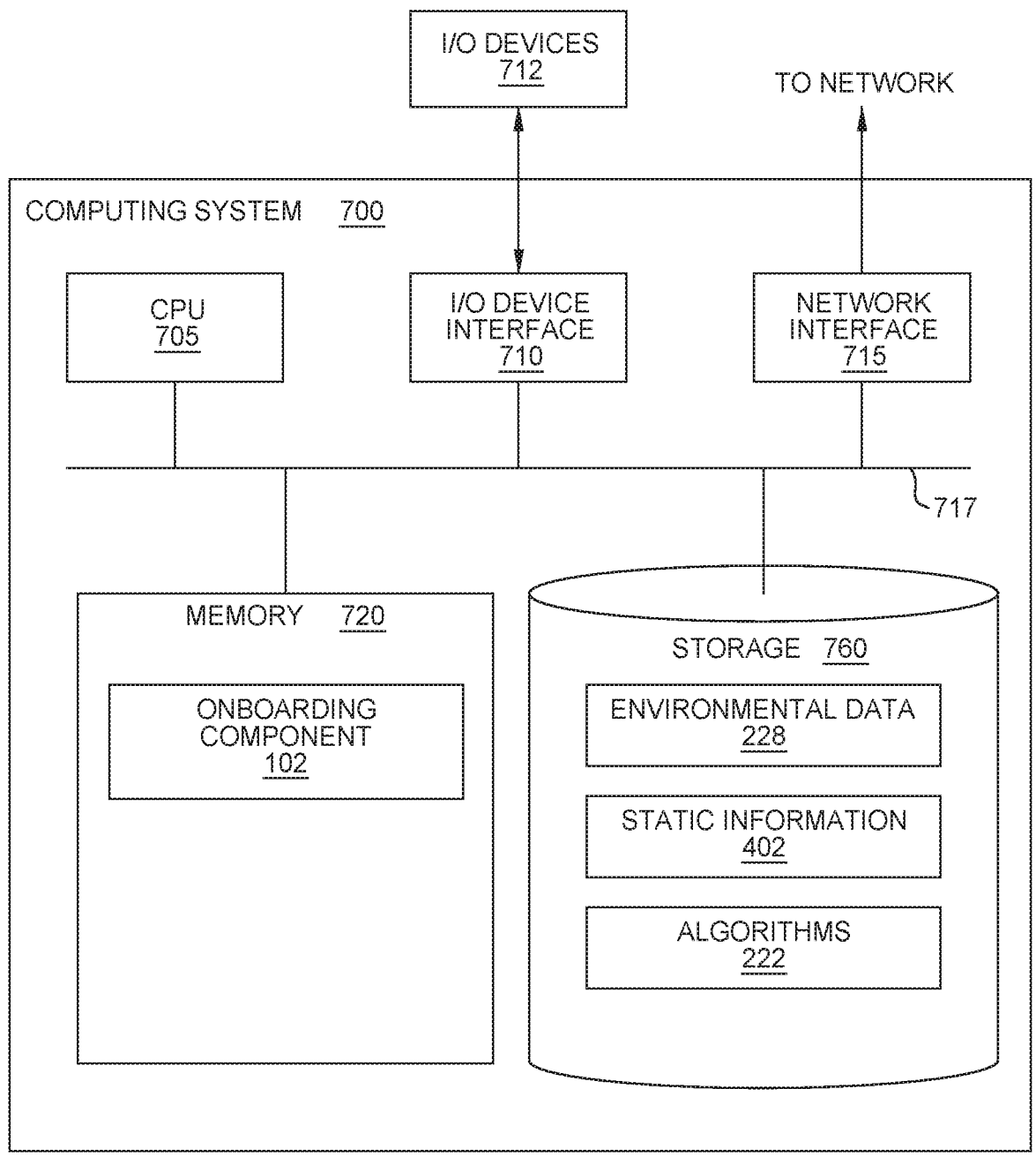
FIG. 7 illustrates a computing system configured to perform device onboarding, according to one embodiment described herein.

FIG. 7 illustrates a computing system 700 configured to perform device onboarding, according to one embodiment. As shown, the computing system 700 includes, without limitation, a central processing unit (CPU) 705, a network interface 715, a memory 720, and storage 760, each connected to a bus 717. The computing system 700 may also include an I/O device interface 710 connecting I/O devices 712 (e.g., keyboard, mouse, and display devices) to the computing system 700. Further, in context of this disclosure, the computing elements shown in the computing system 700 may correspond to a physical computing system (e.g., a system in a data center) or may be a virtual computing instance executing within a computing cloud.

The CPU 705 retrieves and executes programming instructions stored in the memory 720 as well as stores and retrieves application data residing in the memory 720. The interconnect 717 is used to transmit programming instructions and application data between CPU 705, I/O devices interface 710, storage 760, network interface 715, and memory 720. Note CPU 705 is included to be representative of a single CPU, multiple CPUs, a single CPU having multiple processing cores, and the like. Memory 720 is generally included to be representative of a random access memory. The storage 760 may be a disk drive storage device. Although shown as a single unit, storage 760 may be a combination of fixed and/or removable storage devices, such as fixed disc drives, removable memory cards, or optical storage, network attached storage (NAS), or a storage area-network (SAN). The storage 760 includes environmental data 228, static information 402, and algorithm(s) 222, which are described in more detail above. Illustratively, the memory 720 includes the onboarding component 102, which is described in more detail above.

Figure 8:
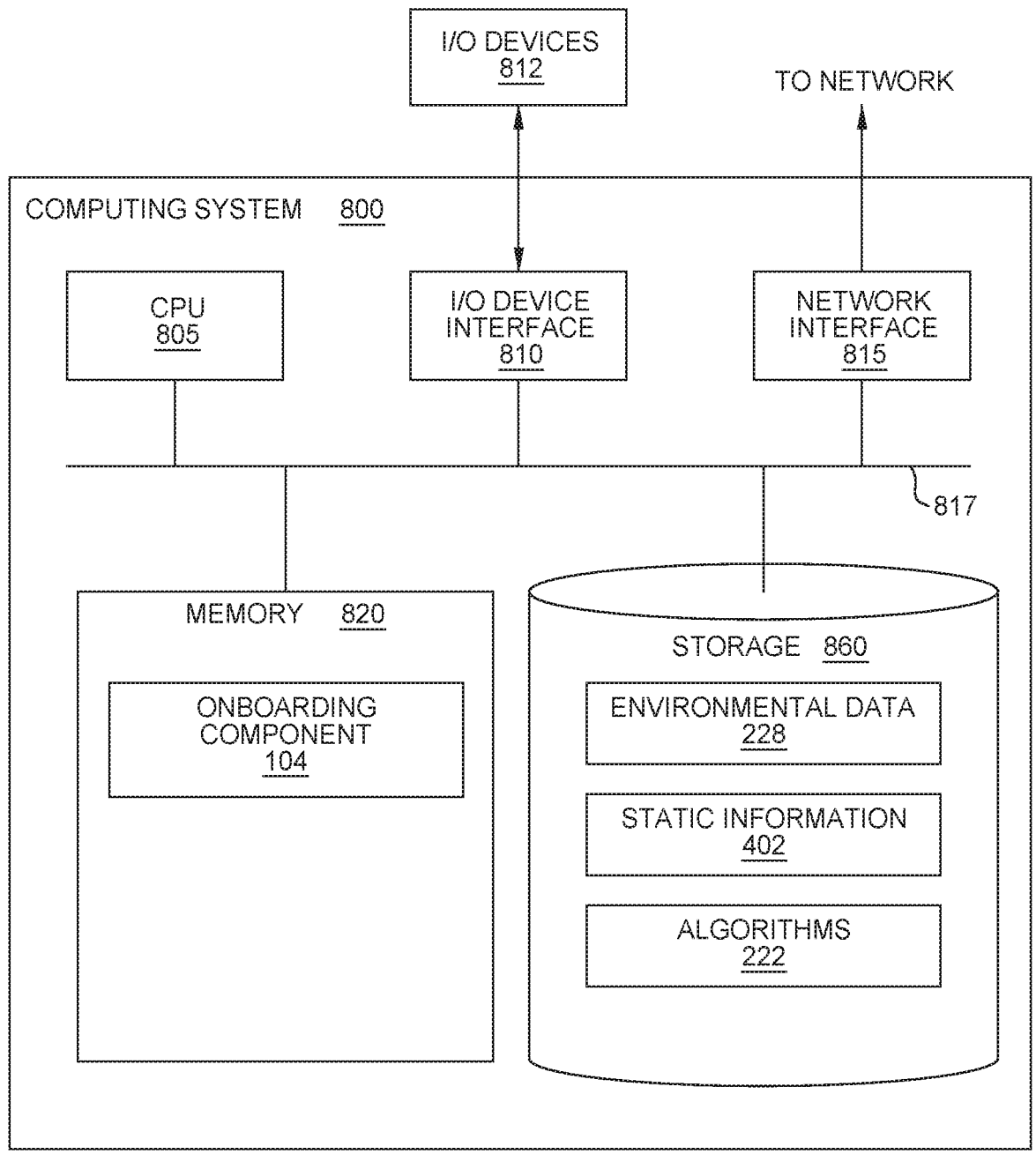
FIG. 8 illustrates another computing system configured to perform device onboarding, according to one embodiment described herein.

FIG. 8 illustrates a computing system 800 configured to perform device onboarding, according to one embodiment. As shown, the computing system 800 includes, without limitation, a central processing unit (CPU) 805, a network interface 815, a memory 820, and storage 860, each connected to a bus 817. The computing system 800 may also include an I/O device interface 810 connecting I/O devices 812 (e.g., keyboard, mouse, and display devices) to the computing system 800. Further, in context of this disclosure, the computing elements shown in the computing system 800 may correspond to a physical computing system (e.g., a system in a data center) or may be a virtual computing instance executing within a computing cloud.

The CPU 805 retrieves and executes programming instructions stored in the memory 820 as well as stores and retrieves application data residing in the memory 820. The interconnect 817 is used to transmit programming instructions and application data between CPU 805, I/O devices interface 810, storage 860, network interface 815, and memory 820. Note CPU 805 is included to be representative of a single CPU, multiple CPUs, a single CPU having multiple processing cores, and the like. Memory 820 is generally included to be representative of a random access memory. The storage 860 may be a disk drive storage device. Although shown as a single unit, storage 860 may be a combination of fixed and/or removable storage devices, such as fixed disc drives, removable memory cards, or optical storage, network attached storage (NAS), or a storage area-network (SAN). The storage 860 includes environmental data 228, static information 402, and algorithm(s) 222, which are described in more detail above. Illustratively, the memory 820 includes the onboarding component 104, which is described in more detail above.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method, comprising:
    determining, by a first computing device, an onboarding algorithm to use for onboarding a wireless device;
    determining, by the first computing device, based on the onboarding algorithm, a first set of predefined information and a second set of dynamically generated information to use as inputs to the onboarding algorithm, wherein the second set of dynamically generated information (i) is based in part on a current set of environmental conditions at a location of the wireless device at a time of an installation attempt of the wireless device and (ii) comprises a pattern of a reset button provided via a user interface of the first computing device;
    generating, by the first computing device via the onboarding algorithm, a set of credentials based on using the first set of predefined information and the second set of dynamically generated information as the inputs to the onboarding algorithm, wherein generating the set of credentials receiving the pattern of the reset button via the user interface of the first computing device, wherein the pattern of the reset button comprises at least one of (i) a number of presses of the reset button, (ii) a duration of each of the number of presses of the reset button, or (iii) a frequency of the number of presses of the reset button; and
    using, by the first computing device, the set of credentials to secure a connection for onboarding the wireless device.

2. The computer-implemented method of claim 1, wherein the first set of predefined information comprises at least one of: a device name of the wireless device, a manufacturer of the wireless device, a media access control (MAC) address of the wireless device, and a serial number of the wireless device.

3. The computer-implemented method of claim 1, wherein the second set of dynamically generated information further comprises at least one of: information associated with the location of the wireless device, and information from a communication frame.

4. The computer-implemented method of claim 1, wherein determining the onboarding algorithm comprises:
    determining identifying information of the wireless device;
    transmitting a request for the onboarding algorithm to a second computing device, the request comprising the identifying information; and
    receiving, in response to the request, (i) an indication of the onboarding algorithm from the second computing device or (ii) executable code of the onboarding algorithm from the second computing device.

5. The computer-implemented method of claim 4, wherein:
    determining the identifying information comprises capturing an image of a barcode located on the wireless device; and
    the identifying information comprises at least one of a release of the wireless device and a serial number of the wireless device.

6. The computer-implemented method of claim 1, wherein the set of credentials comprises at least one of: a service set identifier (SSID), a username, a password, and a basic service set identifier (BSSID).

7. The computer-implemented method of claim 1, wherein using the set of credentials to secure the connection for onboarding the wireless device comprises performing at least one of an authentication procedure and an association procedure with the wireless device with the set of credentials.

8. A computing device, comprising:
    a processor; and
    a memory containing a program that, when executed by the processor, performs an operation comprising:
        determining an onboarding algorithm to use for onboarding a wireless device;
        determining, based on the onboarding algorithm, a first set of predefined information and a second set of dynamically generated information to use as inputs to the onboarding algorithm, wherein the second set of dynamically generated information (i) is based in part on a current set of environmental conditions at a location of the wireless device at a time of an installation attempt of the wireless device and (ii) comprises a pattern of a reset button provided via a user interface of the computing device;
        generating, via the onboarding algorithm, a set of credentials based on using the first set of predefined information and the second set of dynamically generated information as the inputs to the onboarding algorithm, wherein generating the set of credentials comprises receiving the pattern of the reset button via the user interface of the computing device, wherein the pattern of the reset button comprises at least one of (i) a number of presses of the reset button, (ii) a duration of each of the number of presses of the reset button, or (iii) a frequency of the number of presses of the reset button; and
        using the set of credentials to secure a connection for onboarding the wireless device.

9. The computing device of claim 8, wherein the first set of predefined information comprises at least one of: a device name of the wireless device, a manufacturer of the wireless device, a media access control (MAC) address of the wireless device, and a serial number of the wireless device.

10. The computing device of claim 8, wherein the second set of dynamically generated information further comprises at least one of: information associated with the location of the wireless device, and information from a communication frame.

11. The computing device of claim 8, wherein determining the onboarding algorithm comprises:
determining identifying information of the wireless device;
transmitting a request for the onboarding algorithm to another computing device, the request comprising the identifying information; and
receiving, in response to the request, (i) an indication of the onboarding algorithm from the other computing device or (ii) executable code of the onboarding algorithm from the other computing device.

12. The computing device of claim 11, wherein:
determining the identifying information comprises capturing an image of a barcode located on the wireless device; and
the identifying information comprises at least one of a release of the wireless device and a serial number of the wireless device.

13. The computing device of claim 8, wherein the set of credentials comprises at least one of: a service set identifier (SSID), a username, a password, and a basic service set identifier (BSSID).

14. A non-transitory computer-readable storage medium comprising computer program code that, when executed by one or more processors, performs an operation comprising:
determining, by a computing device, an onboarding algorithm to use for onboarding a wireless device;
determining, by the computing device, based on the onboarding algorithm, a first set of predefined information and a second set of dynamically generated information to use as inputs to the onboarding algorithm, wherein the second set of dynamically generated information (i) is based in part on a current set of environmental conditions at a location of the wireless device at a time of an installation attempt of the wireless device and (ii) comprises a pattern of a reset button provided via a user interface of the computing device;
generating, by the computing device via the onboarding algorithm, a set of credentials based on using the first set of predefined information and the second set of dynamically generated information as the inputs to the onboarding algorithm, wherein generating the set of credentials comprises receiving the pattern of the reset button via the user interface of the computing device, wherein the pattern of the reset button comprises at least one of (i) a number of presses of the reset button, (ii) a duration of each of the number of presses of the reset button, or (iii) a frequency of the number of presses of the reset button; and
using, by the computing device, the set of credentials to secure a connection for onboarding the wireless device.

15. The non-transitory computer-readable storage medium of claim 14, wherein the first set of predefined information comprises at least one of: a device name of the wireless device, a manufacturer of the wireless device, a media access control (MAC) address of the wireless device, and a serial number of the wireless device.

16. The non-transitory computer-readable storage medium of claim 14, wherein the second set of dynamically generated information comprises at least one of: information associated with the location of the wireless device, and information from a communication frame.

17. The non-transitory computer-readable storage medium of claim 14, wherein determining the onboarding algorithm comprises:
determining identifying information of the wireless device;
transmitting a request for the onboarding algorithm to a second computing device, the request comprising the identifying information; and
receiving, in response to the request, (i) an indication of the onboarding algorithm from the second computing device or (ii) executable code of the onboarding algorithm from the second computing device.

18. The non-transitory computer-readable storage medium of claim 17, wherein:
determining the identifying information comprises capturing an image of a barcode located on the wireless device; and
the identifying information comprises at least one of a release of the wireless device and a serial number of the wireless device.

19. The non-transitory computer-readable storage medium of claim 14, wherein the set of credentials comprises at least one of: a service set identifier (SSID), a username, a password, and a basic service set identifier (BSSID).

20. The non-transitory computer-readable storage medium of claim 14, wherein using the set of credentials to secure the connection for onboarding the wireless device comprises performing at least one of an authentication procedure and an association procedure with the wireless device with the set of credentials.

* * * * *